United States Patent Office 2,917,654
Patented Dec. 15, 1959

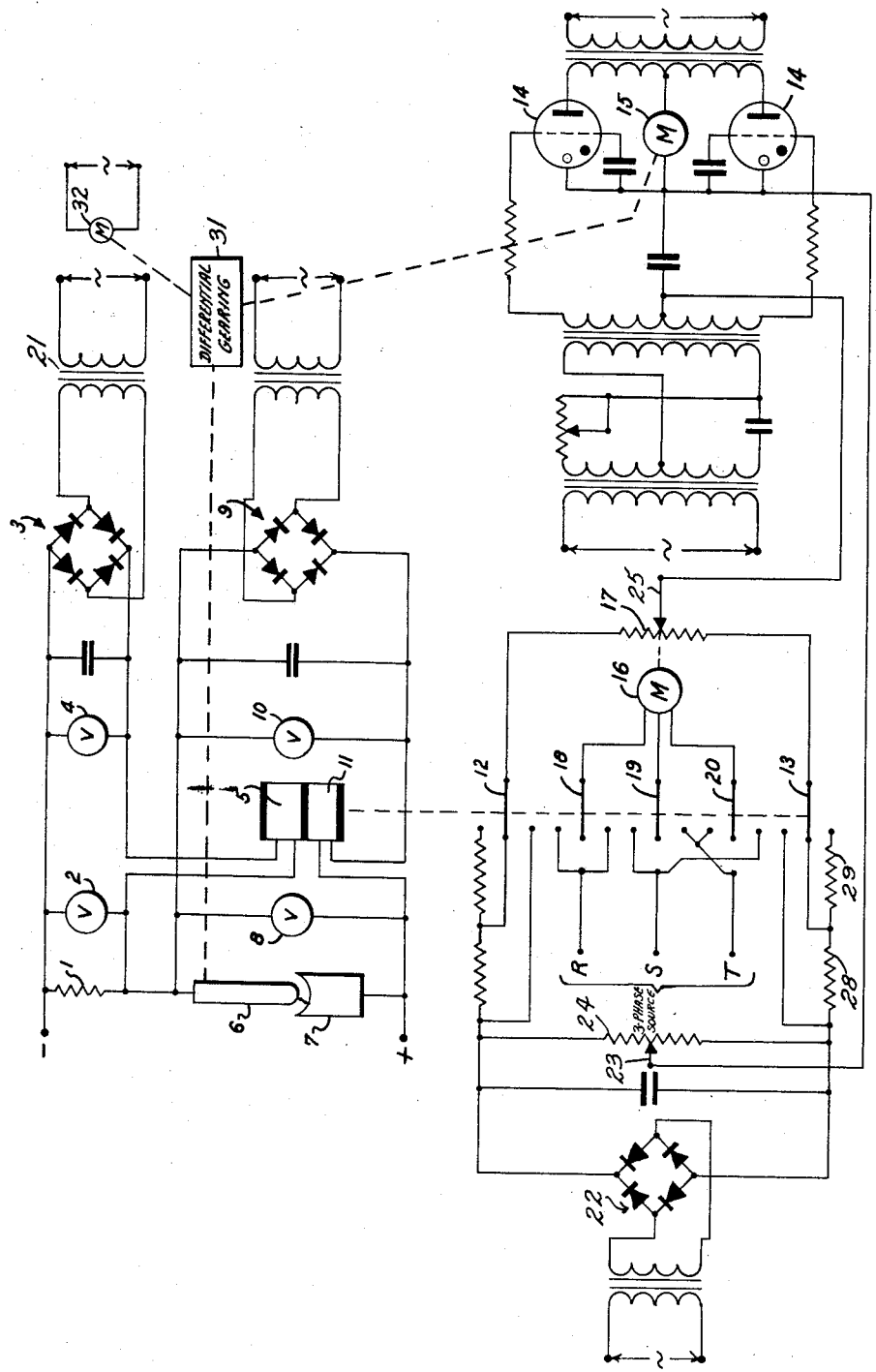

2,917,654

FEED CONTROL MECHANISM FOR CONSUMABLE ELECTRODES IN VACUUM ARC FURNACES

Helmut Gruber and Helmut Scheidig, Hanau (Main), Germany, assignors to W. C. Heraeus G.m.b.H., Hanau (Main), Germany, a corporation of Germany Application February 20, 1958, Serial No. 716,450

7 Claims. (Cl. 314—62)

The present invention relates to vacuum arc furnaces and more particularly to improvements in the means for controlling the feeding movement of consuming electrodes in vacuum arc furnaces.

In our earlier copending application, Serial No. 658,667, filed on May 13, 1957, we have described in detail the most important of the many problems and difficulties arising in the operation of vacuum arc furnaces, in feeding consumable electrodes therein, and in attaining a proper control of the feeding movement of such electrodes. In that application we have also described and claimed the means for solving one of the most important of these problems, that for attaining a rapid control of the arc length within the furnace by the provision of sensitive amplifiers which produce strong and overcompensated control impulses which, in turn, are used to effect a rapid return stroke or a rapid forward movement of the electrode whenever necessary.

It has now been unexpectedly found that a control system of the type as described in the mentioned earlier application may be used not only for attaining a rapid control of the arc length but also for controlling the necessary continuous feeding movement of the consumable electrode so that the mentioned control impulses will only be required relatively infrequently. It is therefore an object of the present invention to utilize the same control impulses which effect a rapid forward or return stroke of the electrode in accordance with an arc length which at one time is too short and at another time too long, for also effecting a modification of the average feeding speed of the electrode.

The problem involved in the present invention is based upon the fact that the electrodes of arc furnaces are very rarely consumed so uniformly that the same feeding speed can be applied for the entire length of the electrode. Therefore, at many points of the electrode it must be fed at a speed greater or smaller than the average speed for the entire electrode.

If the electrode is fed too quickly, either very short arc lengths or short circuits will result. This would require a rapid retraction of the electrode by means of the electric amplifiers. A slight reduction of the feeding speed will, however, reduce the frequency of the occurence of these short circuits considerably. The average number of these retracting impulses within a certain length of time may therefore be used as a measurement for determining whether the prevailing normal feeding speed of the electrode is too high or whether it is adequate. Therefore, in accordance with the above-mentioned object of the present invention, the number of these retracting impulses or the frequency of their occurrence may be utilized for reducing the normal feeding speed of the electrode to such an extent that it will not exceed a certain admissable value.

If, on the other hand, the arc is too long, the danger arises that it might jump over toward the wall of the crucible and perforate the same, thus causing an entry of the cooling water into the furnace, resulting in the destruction of the furnace, as well as possible serious explosions therein. To avoid this, our earlier application, Serial No. 658,667, proposed to advance the electrode in such a case very rapidly and to such an extent that the arc will be absolutely prevented from moving toward the walls of the crucible. Such a rapid advance of the electrode is caused by a control impulse which is produced by an electronic amplifier whenever the arc voltage exceeds a certain predetermined value. The number of these control impulses within a certain length of time therefore constitutes a measurement which will show whether the normal feeding speed will be sufficient to insure a substantially normal arc length. The present invention thus also consists in utilizing the number or frequency of the occurrence of these feeding impulses to effect an increase in the normal rate of feed whenever the number of these feeding impulses within the given length of time might be too large. Such increase in the normal rate of feed will then reduce the number of these feeding impulses to an admissable rate.

If these impulses which effect a rapid advance or retraction of the electrode are directed so as to oppose each other at the entry side of the apparatus which regulates the continuous feeding movement of the electrode, they will always accurately compensate each other when they are of an equal number. An equal number of advancing and retracting impulses, in turn, means that the continuous feed of the electrode corresponds to the rate of consumption of the electrode. In this event, the rate of feed need not be changed. If, however, either the number of advancing impulses exceeds the number of retracting impulses or vice versa, it will be necessary either to reduce or to increase the rate of feed. The normal control of the feeding movements of the electrode should therefore react upon these average values and regulate the normal continuous rate of feed accordingly.

The necessary apparatus for effecting the control operations according to the present invention may consist of electronic circuits of various types known as such. Such circuits generally permit extensive adjustments and thus they also permit the degree of the reaction of the continuous feed upon the changes which are caused by the number of uncompensated control impulses to be adjusted even while the furnace is in operation. An apparatus of this kind may be relied upon to insure for a great length of time the proper operation of a vacuum arc furnace in which consumable electrodes are remelted into the form of ingots.

To reiterate, it is therefore the main object and the principle of the present invention to utilize the number or frequency of occurrence of the control impulses which produce a sudden forward or return movement of the electrode if the arc length is temporarily too small or too large, so as also to effect an adjustment of the normal rate of feed of the electrode.

Insofar as the present invention may be carried out in actual practice, it is immaterial in principle in which particular manner the control impulses are utilized so as to control the mechanism which actually effects the advancing and retracting movements of the electrode. Although various types of mechanisms as known in the art and referred to in the introductory part of our copending application, Serial No. 658,667, may be used for this purpose, it has been found that the new control mechanism as described and claimed in that application is especially suitable. In that apparatus the various values of the electric arc, for example, the arc voltage and amperage, or other electrical values which are dependent upon the arc length and the dependency of these values from the theoretical value may, after being amplified, be used to influence the operation of a feed control mechanism. This mechanism essentially consists of a pair of electric motors which are adapted to rotate continuously in opposite directions to each other and are interconnected by a differential gearing which is also connected to the outer end of the electrode, of a source of current for driving the two motors which is also connected to the crucible of the furnace, as well as to the electrode so as to form an arc, and of sensitive amplifiers, for example, of an electronic or magnetic type, which are responsive to the electrical characteristics of the arc and to changes in the arc from its standard characteristics, and which are adapted to supply strong or overcompensated control impulses to act upon the motors to effect a rapid return stroke or a rapid forward movement of the electrode and to return the arc rapidly to its standard characteristics. The mean voltage for operating these motors is preferably made of a size so that any change in the operating voltage will result in a maximum change in speed of the motors and thus in the feeding speed of the electrode.

Further objects, features, and advantages of the present invention will be apparent from the following detailed description and the accompanying drawing of a basic circuit diagram which illustrates the underlying principal of the invention in which the rate of feed of the electrode is controlled by two electric motors which rotate continuously in opposite directions to each other and in which one motor is designed to rotate at a constant speed, while the other motor, the average speed of which is compensated by means of a differential gearing, is controlled by the apparatus and circuit arrangement as will now be described.

Referring to the drawing, the current flowing through the arc from a D.C. supply (not shown) produces in a shunt 1 a voltage drop of a size which is proportional to the arc current. This voltage drop will be indicated by an instrument 2 and compensated at the relay coil 5 by a D.C. voltage source indicated generally at 3 and an instrument 4. The voltage source may be a conventional bridge rectifier connected across the secondary of a transformer 21, the primary of which is connected to an A.C. power source (not shown). The voltage of voltage source 3 has the same amplitude as the voltage drop at shunt 1 which is to be attained by the desired arc current.

The arc voltage is branched off at the electrode 6 and the crucible 7. This voltage which is indicated by an instrument 8 is compensated at a relay coil 11 by a voltage source 9 similar to the source 3 and an instrument 10. The voltage of voltage source 9 has the same amplitude as the intended voltage of the arc.

Relay coils 5 and 11 form a part of a polarized relay which additionally consists of the contact elements 12, 13, 18, 19, and 20. It has a central neutral position and two operating positions which are dependent upon the polarity of the current as applied thereto.

If the amplitude of the voltage drop at shunt 1 as indicated by the instrument 2 exceeds the amplitude of the compensating voltage of voltage source 3 as indicated by the instrument 4, the voltage difference at relay coil 5 will adjust the polarized relay to the same operating position as if the amplitude of the arc voltage as indicated by instrument 8 would drop below the compensating voltage of voltage source 9 as indicated by instrument 10 when a corresponding voltage difference would then occur at the relay coil 11. Both instances will, however, occur in the event that electrode 6 approaches the surface of the pool of molten metal in crucible 7 too closely.

The polarized relay will be shifted to the opposite operating position if electrode 6 moves too far away from the pool of molten metal in crucible 7 since the difference in the amplitudes on relay coils 5 and 11 will then change inversely due to the fact that the current will then decrease and the voltage drop in shunt 1 will therefore become smaller, while the voltage in the longer arc will then increase.

A circuit is controlled by the relay consisting of a D.C. source, indicated generally at 22, a variable reference tap 23 provided by a potentiometer 24 connected across the source 22, and a variable output tap 25 provided by a potentiometer 17. The potentiometer 17 is part of a tapped voltage divider including the contact elements 12 and 13, resistors 26 and 27, and resistors 28 and 29. With the polarized relay in its neutral position, resistors 26 and 28 are connected at either end of the potentiometer 17 across the source 22, providing a substantially balanced arrangement between the taps 23 and 25. With the polarized relay energized to move the contact 12 and 13 up, resistors 26 and 27 are connected in series to one end of the potentiometer 17 with no resistor connected to the other end, providing an unbalanced arrangement in which a substantial potential difference of one polarity exists between the taps 23 and 25. With the reverse energization of the relay, the resistors 28 and 29 are connected in series with the potentiometer 17 at the other end, producing an unbalanced arrangement in which a potential difference of opposite polarity exists between the taps 23 and 25.

During the length of time of the deviations as above described, the relay contacts 12 and 13 will transmit relatively great changes in the control voltage between the taps 23 and 25 to a pair of thyratrons 14 which are connected in push-pull across a motor load 15. Power is derived across a transformer 22 having a center-tapped secondary and a primary connected to the A.C. power source (not shown). The motor 15, which is controlled by thyratrons 14 and, in turn, controls the feeding speed of electrode 6 and the distance between the electrode and the surface of the molten metal in crucible 7, will be adjusted to a speed which rapidly overcomes the respective deviation.

The firing point of the thyratrons 14 is controlled by the control voltage applied between the grids and cathodes from taps 23 and 25. An A.C. signal, from a phase shift network indicated generally at 30, is added to the control voltage on both grids, whereby the firing point is advanced or retarded in both thyratrons with changes in the control voltage in a wellknown manner.

The motor 15 thus increases or decreases its speed with changes in the control voltage produced by the relay, as described above. The motor 15 controls the feed of the electrode 6 through a differential gearing, indicated generally at 31. A constant speed motor 32 also drives the differential gearing, whereby the rate of feed of the electrode is determined by the difference in speed of the two motors 15 and 32. With the polarized relay in the neutral position, the potentiometers 17 and 24 are set so that the control voltage between taps 23 and 25 causes the motor 15 to run at a slightly different speed than the motor 32. As a result the output of the differential gearing produces a normal rate of feed for the electrode 6.

The present invention further provides a third motor 16 which acts as a control motor and is connected so as to rotate either in the right-hand or left-hand direction, depending upon the direction of the deviation. This is accomplished by contacts 18, 19, and 20 controlled by the relay, the contacts being arranged to effect rotation of the motor 16 in one direction when the relay is polarized in one direction and to effect rotation of the motor 16 in the other direction when the relay is polarized in the opposite direction. With the relay in the neutral position, the motor 16 is not energized. For example, the motor 16 may be a three-phase motor, the three-phase line source (not shown) being connected at R, S and T. The phases at S and T are interchanged by the contacts 19 and 20 to cause reversal of the motor 16 by the polarized relay. Everytime the relay is momentarily actuated by a difference in current through the coils 5 and 11, the motor 16 is caused to rotate one way or the other, adjusting the tap on the potentiometer accordingly. The control voltage which is tapped off on the potentiometer 17 is then adjusted thereon by the motor 16 so that if the impulse produced by the relay is caused by too close an approach of the electrode to the surface of the molten metal in crucible 7, motor 15 will produce a smaller average feed of electrode 6, or so that, if the impulse is caused by too great a distance between electrode 6 and the surface of the metal, motor 15 will produce a greater average feed of the electrode.

The circuit arrangement according to the present invention therefore attains two results: first, as described in the earlier application, Serial No. 658,667, it produces a rapid forward or reverse movement of the electrode whenever the electrode approaches the surface of molten metal in the crucible too closely or moves too far away therefrom, and secondly, in accordance with the present invention, it produces the additional result that the average feeding speed will be adjusted by the potentiometer 17 so that deviations in the distance between the electrode and the surface of molten metal from the desired value will occur much less frequently and the entire operation will thus be much smoother and more continuous.

Although our invention has been illustrated and described with reference to the preferred embodiments thereof, we wish to have it understood that it is in no way limited to the details of such embodiment, but is capable of numerous modifications within the scope of the appended claims.

Having thus fully disclosed our invention, what we claim is:

1. A mechanism for controlling the feeding movement of a consumable electrode in a vacuum arc furnace comprising means for feeding said electrode at a normal rate of speed, means for rapidly advancing and retracting said electrode, means for supplying control impulses to said advancing and retracting means so as to operate the same when the arc within said furnace is too long or too short, respectively, and means responsive to the frequency of the occurrence of said control impulses for adjusting said normal rate of speed of said electrode.

2. A mechanism for controlling the feeding movement of a consumable electrode in a vacuum arc furnace comprising means for feeding said electrode at a normal rate of speed, means for rapidly advancing and retracting said electrode, means for supplying control impulses to said advancing and retracting means so as to operate the same when the arc within said furnace is too long or too short, respectively, and means responsive to the frequency of the occurrence of the retracting control impulses for reducing said normal rate of speed of said electrode in proportion to said frequency of said retracting impulses.

3. A mechanism for controlling the feeding movement of a consumable electrode in a vacuum arc furnace-comprising means for feeding said electrode at a normal rate of speed, means for rapidly advancing and retracting said electrode, means for supplying control impulses to said advancing and retracting means so as to operate the same when the arc within said furnace is too long or too short, respectively, and means responsive to the frequency of the occurrence of the advancing control impulses for increasing said normal rate of speed of said electrode in proportion to said frequency of said advancing impulses.

4. A mechanism for controlling the feeding movement of a consumable electrode in a vacuum arc furnace comprising means for feeding said electrode at a normal rate of speed, means for rapidly advancing and retracting said electrode, means for supplying first control impulses to said advancing means so as to operate the same when the arc within said furnace is too long and for supplying second control impulses to said retracting means so as to operate the same when the arc is too short, and means responsive to the difference in the number of said first and second impulses for thereby adjusting said normal rate of speed of said electrode.

5. Apparatus for controlling the arc between a pair of electrodes comprising means for passing a current through the electrodes to form an arc therebetween, motor means for moving one electrode in relation to the other electrode to vary the length of the arc, means responsive to flow of current through the electrodes for abruptly actuating said motor means to advance and retract said one electrode at a relatively fast rate whenever the current through the electrode respectively drops below or exceeds a predetermined current range in which a normal arc is sustained, means including additional reversible motor means controlling the first-mentioned motor means for normally advancing said electrode at a relatively slow rate when the current through the electrodes is within said predetermined current range, the additional motor means controlling the first-mentioned motor means to vary said relatively slow rate of electrode advance, said means including the additional motor means being responsive to the means for abruptly advancing and retracting said one electrode.

6. Apparatus as defined in claim 5 wherein the additional reversible motor means is activated momentarily in one direction by said means for abruptly advancing and retracting said one electrode when the electrode is advanced and the additional motor means is activated momentarily in the other direction when the electrode is retracted.

7. Apparatus as defined in claim 6 wherein the additional motor means is activated in a direction to increase the relatively slow rate of advance of the electrode by said first-mentioned motor means when the means for abruptly actuating the first-mentioned motor means acts to abruptly advance the electrode.

References Cited in the file of this patent

UNITED STATES PATENTS

| | | |
|---|---|---|
| 1,392,437 | Morton | Oct. 4, 1921 |
| 2,458,503 | Carpenter et al. | Jan. 11, 1949 |